J. T. MURRAY.
PISTON RING.
APPLICATION FILED MAR. 17, 1919.
1,346,237.
Patented July 13, 1920.
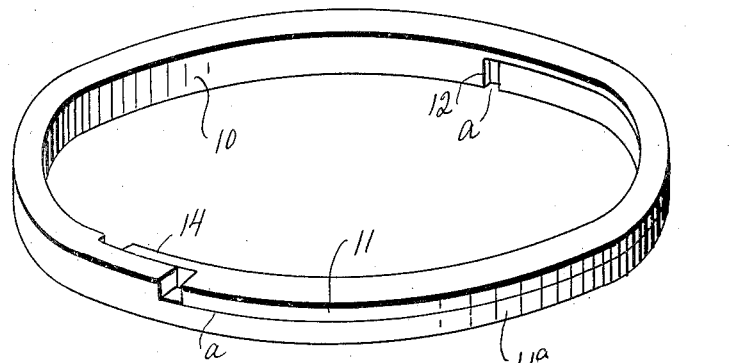
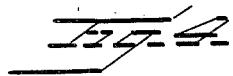
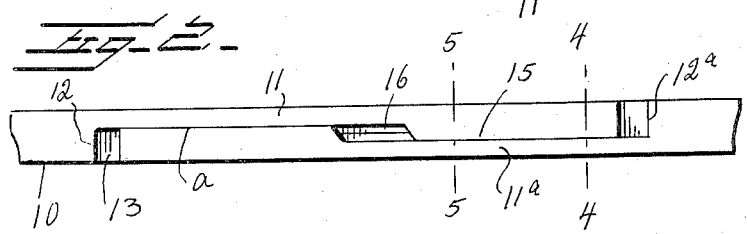
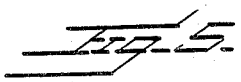
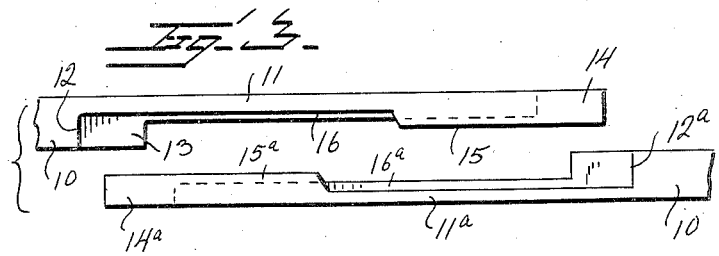
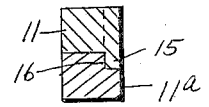
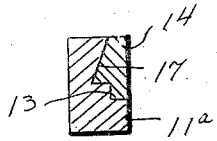
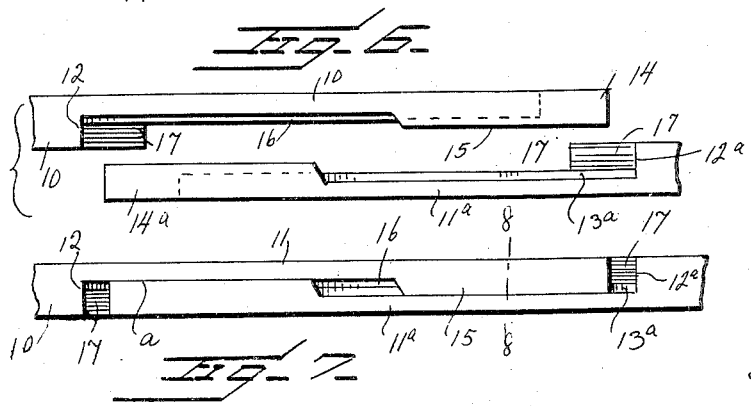
Inventor
J. T. Murray
By Watson E. Coleman
Attorney

UNITED STATES PATENT OFFICE.

JOHN T. MURRAY, OF DANIELSVILLE, GEORGIA.

PISTON-RING.

1,346,237.    Specification of Letters Patent.    Patented July 13, 1920.

Application filed March 17, 1919. Serial No. 283,199.

*To all whom it may concern:*

Be it known that I, JOHN T. MURRAY, a citizen of the United States, residing at Danielsville, in the county of Madison and State of Georgia, have invented certain new and useful Improvements in Piston-Rings, of which the following is a specification, reference being had to the accompanying drawings.

This invention relates to the rings used in pistons of internal combustion engines and other like structures, and the general object of the invention is to provide an improved form of piston ring so constructed as to prevent leakage past the piston ring and thus prevent loss of compression and the fouling of the internal combustion cylinder through the passage of oil past the piston ring into the cylinder, or the passage of products of combustion past the piston ring.

A further object is to provide a piston ring so constructed as to permit uniform expansion in a perfect circle and further permitting the piston ring to have an equal thickness all around.

A further object is to so construct the piston ring as to effectively seal the joint between the two overlapping extensions of the ring, and in this connection to so form the ring that the outside of the ring will have a continuous smooth surface so that it will not cut or score the cylinder.

Other objects will appear in the course of the following description.

My invention is illustrated in the accompanying drawings, wherein:—

Figure 1 is a perspective view of a piston ring constructed in accordance with my invention;

Fig. 2 is a fragmentary inside face view of the ring as shown in Fig. 1;

Fig. 3 is an inside face view as in Fig. 2 but with the two end portions of the ring separated from each other;

Fig. 4 is a section on the line 4—4 of Fig. 2;

Fig. 5 is a section on the line 5—5 of Fig. 2;

Fig. 6 is a fragmentary inside face view of a preferable form of piston ring;

Fig. 7 is a like view to Fig. 6, but with the two ends of the ring in contact with each other; and Fig. 8 is a section on the line 8—8 of Fig. 7.

In Figs. 1 to 5, I show a ring 10, the end portions 11 and $11^a$ of which are reduced in thickness so that these end portions overlap. The inner end of the end portion 11 terminates in a shoulder 12, to which the extremity of the other end portion $11^a$ is opposed. On its inner face, the ring at its junction with the end portion 11 is recessed, as at 13. The other end of the portion 11 is reduced in width to form a tongue 14. As illustrated in Fig. 3, this tongue has a width greater than the end portion 11, of which it forms a part, but less than that of the body of the ring, and a flange 15 extends from the tongue a distance along the portion 11, the edge of this flange coinciding with the edge of the tongue. This flange has the same depth as the depth of the recess 13 and this recess 13 is extended longitudinally along the face of the portion 11, as at 16.

The end portion $11^a$ on the opposite end of the ring has the same form as the portion 11, but the recesses, flanges, and other features of the portion $11^a$ are complementary to the portion 11. I have distinguished the various flanges, recesses, etc., on the portion $11^a$ from the like recesses and flanges on the portion 11 by using the exponent $a$ in connection with the numerals indicating the various parts of the portion $11^a$.

In Figs. 6 and 7, I show another and more effective ring, which is constructed in exactly the same manner as the ring shown in Fig. 1, wherefore the same reference numerals are used, but which has an additional feature in that the inner face of the recess 13 instead of being parallel to the face of the ring, is inclined, as at 17, and the confronting faces of the complementary tongue 14 (or $14^a$) are likewise beveled or inclined so that the tongue on one end portion will have an interlocking engagement with the recess 13 on the opposite portion of the ring which will tend to prevent the portion 11 from moving away from the portion $11^a$ in a direction at right angles to the plane of the ring, this interlock, however, permitting the end portions of the ring to shift longitudinally upon each other.

Of course, it will be understood that the ring is resilient and tends to expand. It will be seen from Fig. 1 that the outside face of the ring is relatively plain and that when the tongues 14 and 14ᵃ of the end portions 11 and 11ᵃ are engaged in their respective recesses 13 and 13ᵃ, the engagement is such that the two overlapped portions 11 and 11ᵃ cannot move outward relative to each other, but these overlapped portions can move together outward or inward, the two overlapped portions sliding upon each other to permit the contraction or expansion of the ring.

It will be noted that the flange 15 and the upper edge of the tongue 14 move in the recesses 16ᵃ and 13ᵃ and that when the ring is expanded, steam or other fluid cannot escape past the joint $a$ because of the fact that the tongue 14 or 14ᵃ at this joint extends down behind the portion 11 or 11ᵃ at this joint $a$. If this tongue did not extend down behind this joint, that is extend beyond the surface of the other end portion 11 or 11ᵃ, there would be a tendency for the fluid to leak through the joint. This is prevented, however, by having the tongue on one end portion not only overlap the other end portion longitudinally, but extend below or above the end portion.

The advantages of a piston ring constructed in accordance with my invention are, in the first place, that it is leak-proof so that when closed the ring forms practically a solid wall of steel with no gap even when the ring expands, and furthermore, the construction illustrated in Figs. 6 to 8 causes the end portions 11 and 11ᵃ to be held close together. Again, inasmuch as the recesses, flanges, and tongues are on the inner side of the ring, there will be no scratching or scoring of the cylinder walls, the outside of the ring presenting practically a smooth and relatively unbroken surface. The constructions which I have described permit uniform expansion of the ring. The ring expands in a perfect circle, hence the ring can be made of even thickness all the way around and this uniform expansion insures equal wear on all sides.

I claim:—

1. A piston ring having its ends reduced in width to provide superposed overlapping end portions, the extremity of each end portion being reduced in thickness to provide a tongue, the body of the ring being recessed on its opposite face at the junction of the body with the end portions, each recess receiving the tongue of the opposite end portion, the tongue being wider than the end portion from which it extends, and said end portion having a longitudinally extending flange forming a continuation of one edge of the tongue, the inner face of each end portion being longitudinally recessed to receive said flange.

2. A piston ring having its ends reduced in width to provide superposed overlapping end portions, the extremity of each end portion being reduced in thickness to provide a tongue, the body of the ring being recessed on its opposite face at the junction of the body with the end portions, each recess receiving the tongue of the opposite end portion, the tongue being wider than the end portion from which it extends, and said end portion having a longitudinally extending flange forming a continuation of one edge of the tongue, the inner face of each end portion being longitudinally recessed to receive said flange, the confronting faces of the tongues and first named recesses being complementarily beveled to interlock the end portions of the rings with each other to prevent separation of the end portions of the rings in a direction at right angles to the plane of the ring.

In testimony whereof I hereunto affix my signature in the presence of two witnesses.

JOHN T. MURRAY.

Witnesses:
E. C. GRIFFITH,
O. K. GRIFFITH.